Sept. 23, 1952   F. F. KISHLINE ET AL   2,611,625
INDEPENDENT FRONT WHEEL SUSPENSION COUPLED
AS A UNIT TO THE VEHICLE FRAME
Filed April 24, 1946   6 Sheets-Sheet 2
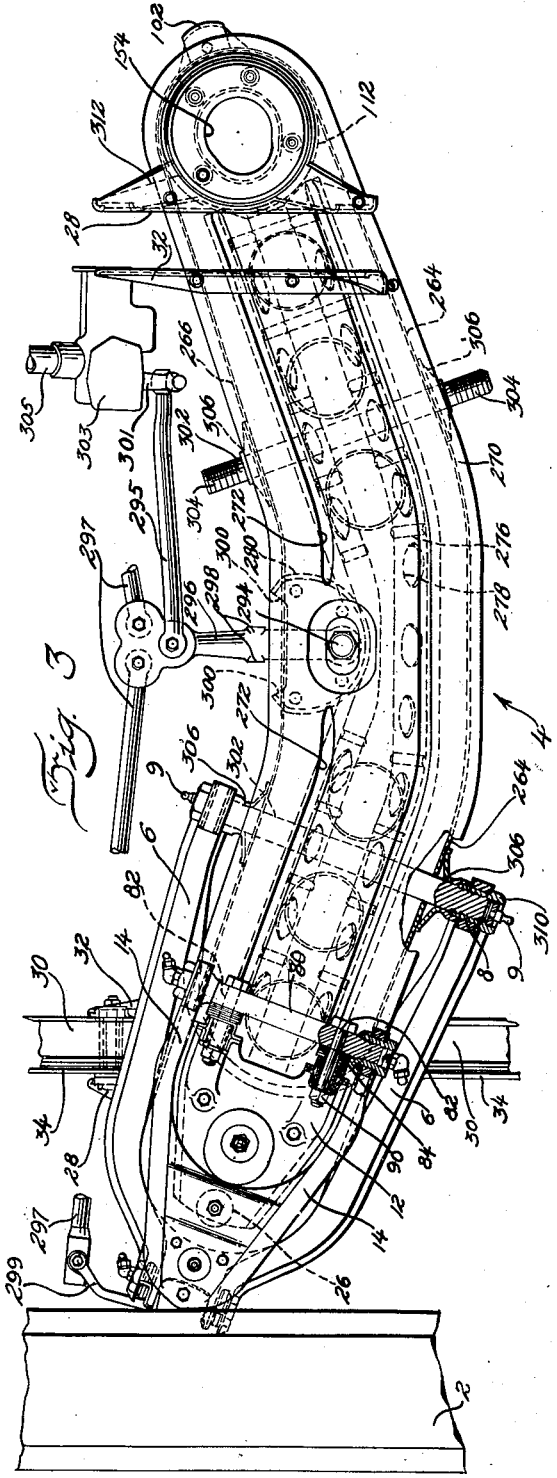
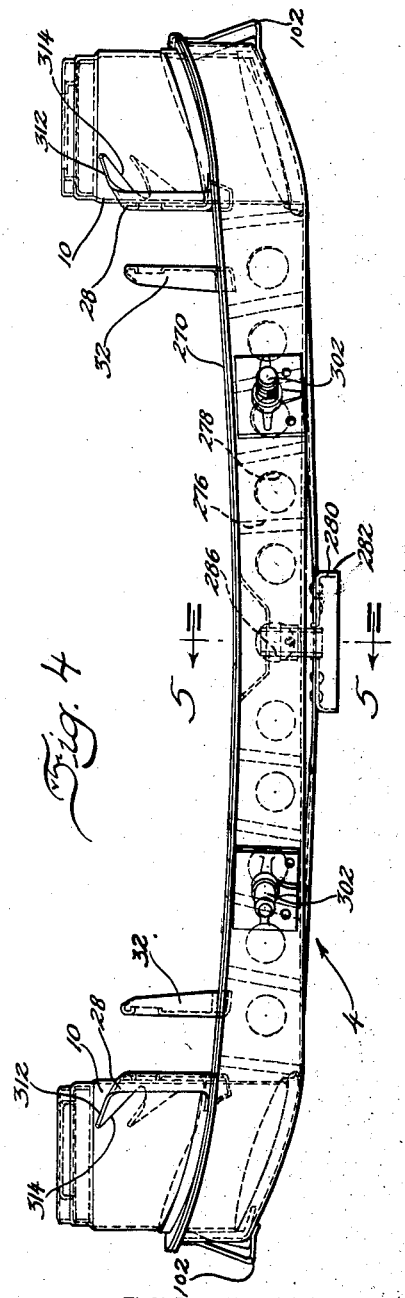
FLOYD F. KISHLINE
ROSS H. PHELPS
JOHNSTON STUART VOIGT
INVENTORS
BY Carl J. Barbee
THEIR ATTORNEY

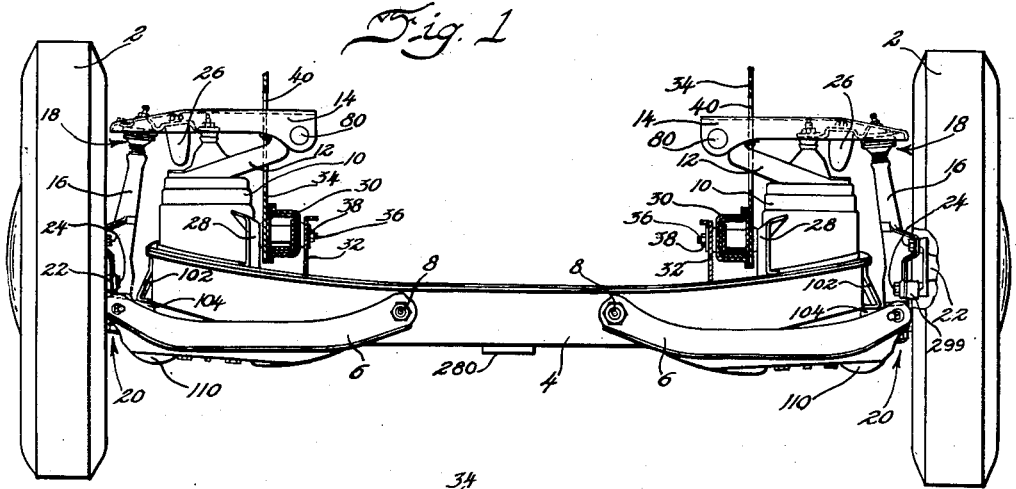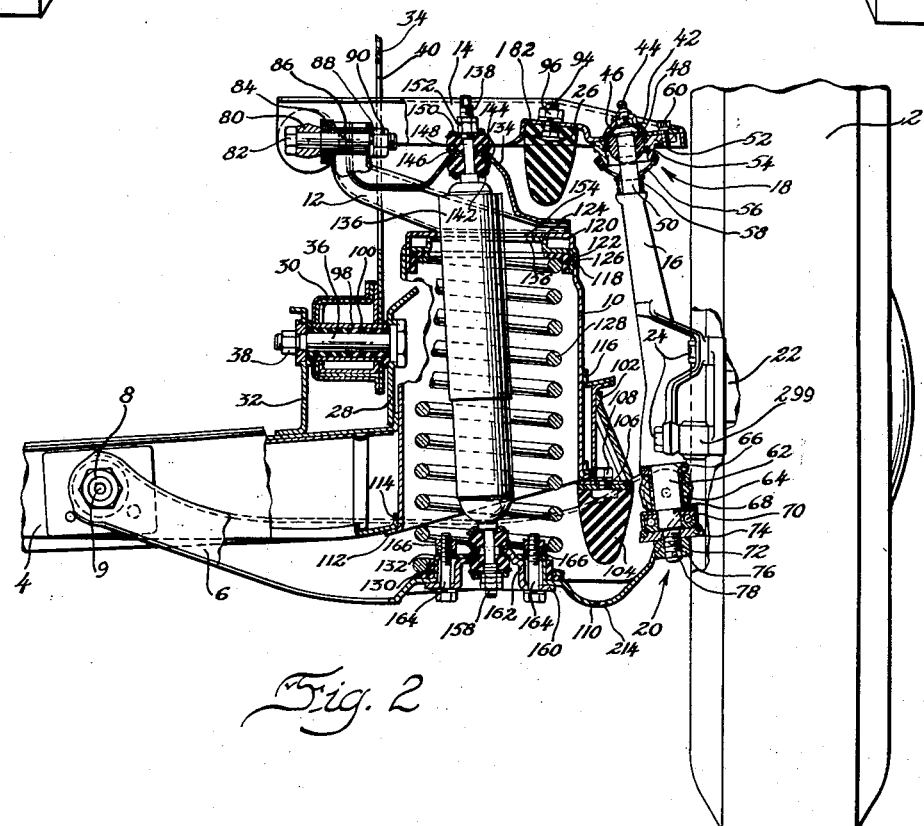

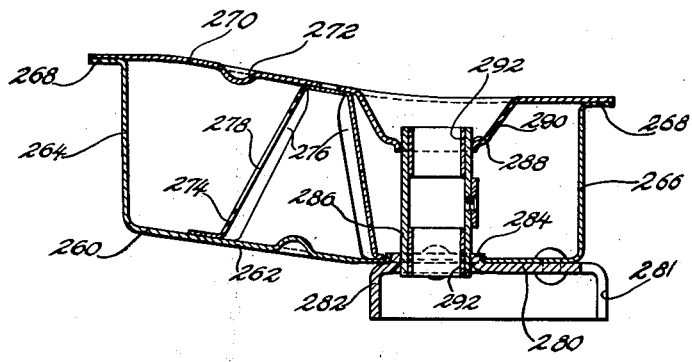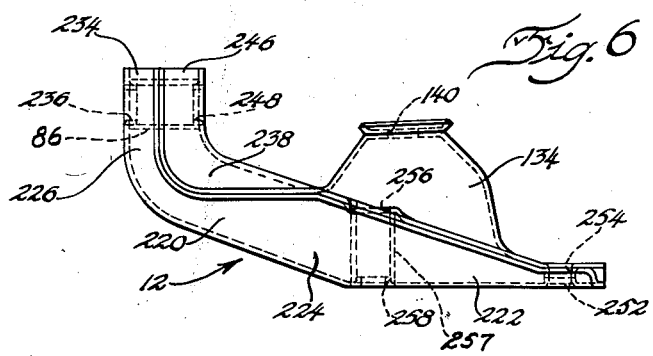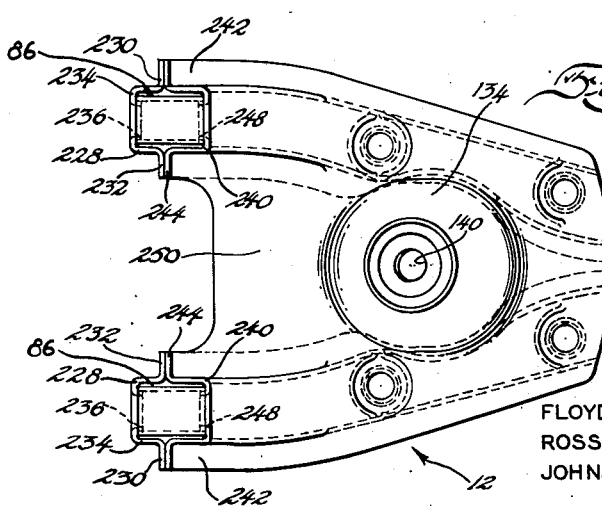

Sept. 23, 1952　　　F. F. KISHLINE ET AL　　　2,611,625
INDEPENDENT FRONT WHEEL SUSPENSION COUPLED
AS A UNIT TO THE VEHICLE FRAME
Filed April 24, 1946　　　　　　　　　　　　　　6 Sheets-Sheet 4

FLOYD F. KISHLINE
ROSS H. PHELPS
JOHNSTON STUART VOIGT
INVENTORS

BY Carl J. Barbee
THEIR ATTORNEY

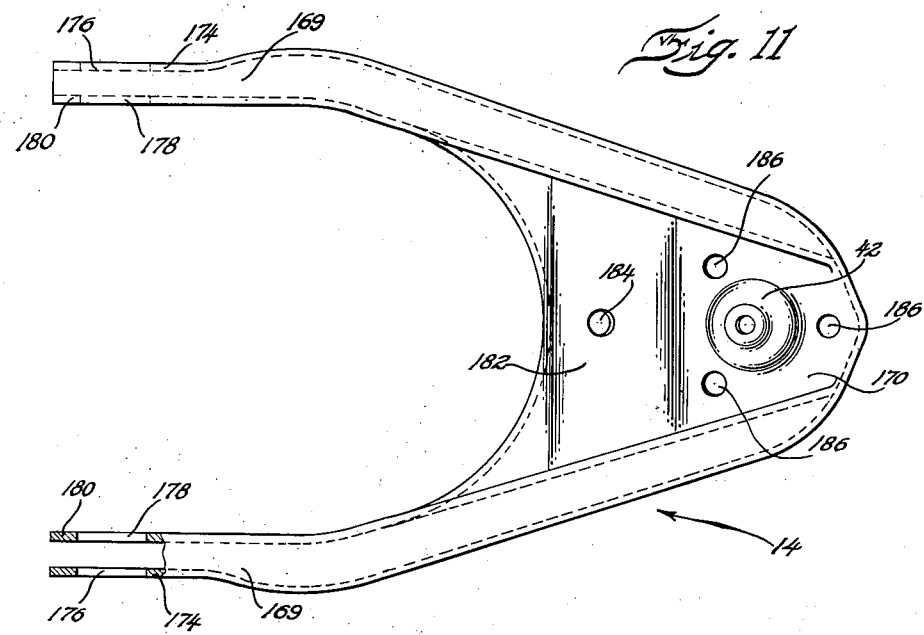
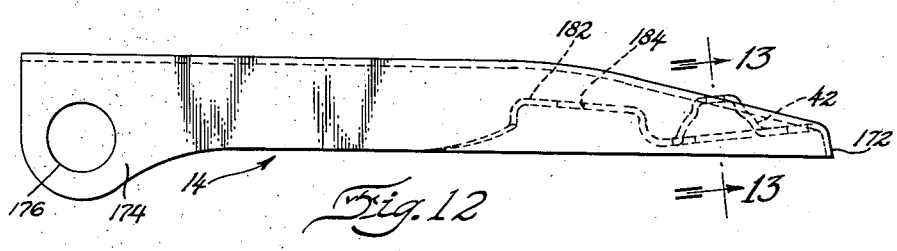
FLOYD F. KISHLINE
ROSS H. PHELPS
JOHNSTON STUART VOIGT
INVENTORS

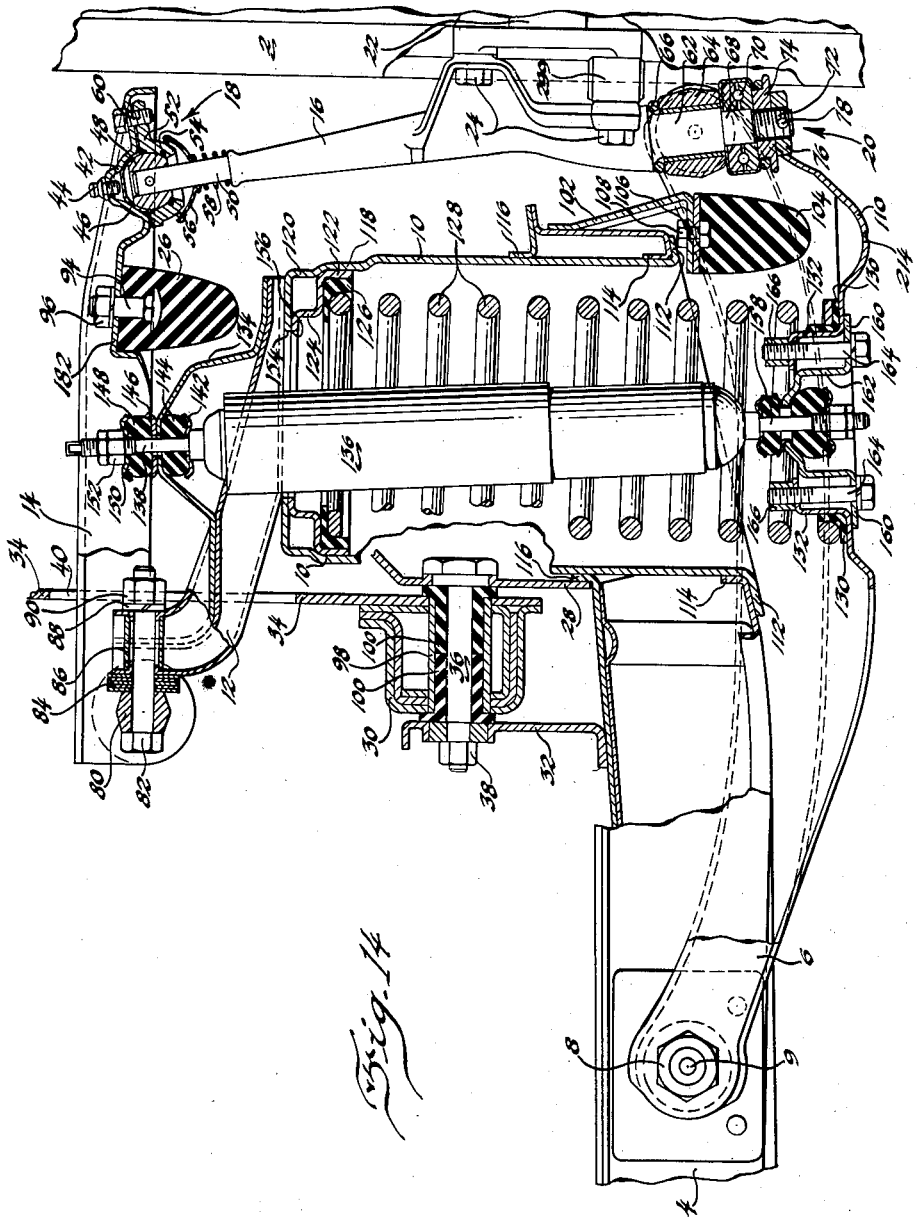

Patented Sept. 23, 1952

2,611,625

UNITED STATES PATENT OFFICE 2,611,625

INDEPENDENT FRONT WHEEL SUSPENSION COUPLED AS A UNIT TO THE VEHICLE FRAME

Floyd F. Kishline, Ross H. Phelps, and Johnston Stuart Voigt, Kenosha, Wis., assignors to Nash-Kelvinator Corporation, Kenosha, Wis., a corporation of Maryland Application April 24, 1946, Serial No. 664,632

6 Claims. (Cl. 280—96.2)

This invention relates to wheel suspensions and more particularly to an independent front wheel suspension for automobiles.

It is an object of this invention to provide an independent wheel suspension for a vehicle which is simple and economical to manufacture.

It is another object of this invention to provide an independent wheel suspension for a vehicle which will be completely assembled and adjusted before it is secured to the body of the vehicle.

It is another object of this invention to provide an independent wheel suspension for a vehicle in which many of the parts are integral units, thus reducing the total number of parts in the complete assembly.

It is a further object of this invention to provide an independent wheel suspension for a vehicle which will provide a smoother ride to the occupants of the vehicle and also easier steering of said vehicle.

Further objects and advantages of the invention will appear hereinafter as the description proceeds and will be pointed out more fully in connection with the appended claims.

In the drawings, of which there are six sheets and in which the same numbers are used to indicate like members:

Figure 1 is a front elevational view of the invention as applied to the front wheels of an automobile;

Figure 2 is a view similar to Figure 1 but enlarged and partially in section and showing the invention as applied to only one wheel of an automobile;

Figure 3 is a top plan view of the frame cross member of the invention to which is attached a portion of the steering mechanism and wheel carrying means of the invention;

Figure 4 is a front elevational view of the cross member shown in Figure 3;

Figure 5 is a sectional view taken along the lines 5—5 of Figure 4 and looking in the direction of the arrows;

Figure 6 is a side elevational view of the upper-control-arm-carrying member;

Figure 7 is a top view of the member shown in Figure 6;

Figure 8 is a top view of the lower control arm;

Figure 9 is a side elevational view of the control arm shown in Figure 8;

Figure 10 is a sectional view of the control arm shown in Figure 9 taken along the lines 10—10 of Figure 9 and looking in the direction of the arrows;

Figure 11 is a top view of the upper control arm of the invention;

Figure 12 is a side elevational view of the upper control arm shown in Figure 11;

Figure 13 is a sectional view of the upper control arm taken along lines 13—13 of Figure 12 and looking in the direction of the arrows; and Figure 14 is an enlarged view of the invention as shown in Figure 2.

Referring in detail to the drawings, the invention as shown in Figure 1 is applied to both of the front wheels 2 of an automobile and comprises a rigid cross member 4 extending between the wheels 2 to which is rotatively secured the lower control arms 6. The control arms 6 are secured at their inner ends to cross member 4 by bolts 8.

Cross member 4 is provided with a pair of towers 10 on the top of which are secured upper-control-arm-carrying members 12. Members 12 carry the upper control arms 14, the inner ends of which are rotatably secured to the members 12.

Wheel carrying pins 16 are positioned between the outer ends of lower control arms 6 and upper control arms 14 and are rotatably secured to the upper arms 6 by ball and socket joints indicated generally at 18 (Figures 1 and 2) and are rotatably secured to the lower control arms 6 by trunnion connections indicated generally at 20 (Figures 1 and 2).

The wheel spindles 22 on which the wheels 2 are mounted have portions extending through apertures in pins 16 and nuts 24 are threaded on said portions to rigidly secure spindles 22 to pins 16. To upper control arms 14 are secured rubber bumpers 26 which strike members 12 when wheels 2 are lowered excessively.

Sheet metal stampings 28 are secured to the top of cross member 4 to brace towers 10 and also aid in securing the cross member 4 to the side rails 30 of the automobile frame. Stampings 32 are secured to the top of cross member 4 and spaced from stampings 28 a distance sufficient to permit side rails 30 of the frame to be placed therebetween. Wheel housings 34 extend downwardly and are secured to rails 30 between said rails and stampings 28. Bolts 36 are passed through aligned apertures in stampings 28, housings 34, rails 30 and stampings 32 and have nuts 38 threaded on the inner ends thereof to rigidly connect said members together. The inner ends of upper control arms 14 extend through apertures 40 in wheel housings 34.

Looking at Figure 2 wherein the invention is shown more in detail, it will be noted that the connection 18 which connects the pin 16 to upper control arm 14 is a ball and socket joint consisting of a socket-like member 42 formed near the outer end of arm 14. In an aperture in the top of member 42 is secured a lubricating valve 44 for lubrication of connection 18.

On the inner surface of member 42 is positioned a bearing 46 within which is positioned a partially spherical member 48. Member 48 has an aperture extending through the center thereof into which extends the reduced portion 50 of pin 16.

A ball retainer 52 is positioned around reduced portion 50 of pin 16 and is secured to control arm 14 by a threaded bolt 60. Retainer 52 is provided with a bearing 54 designed to extend inwardly into engagement with ball member 48 on its lower surface to hold member 48 in engagement with the upper bearing 46. Below retainer 52 and positioned around reduced portion 50 is a cuplike member 56 which is adapted to frictionally engage the lower spherical surface of retainer 52 to prevent dirt, etc. from entering the ball and socket connection 18. Cuplike member 56 is constantly urged upwardly into engagement with retainer 52 by compression spring 58 which is interposed between cuplike member 56 and the enlarged central portion of pin 16.

Pin 16 is provided with a second reduced portion 62 formed near its lower end. Around reduced portion 62 is positioned a trunnion member 64. A metal ring 66 is positioned around portion 62 between trunnion 64 and the lower end of the enlarged portion of pin 16.

A third reduced portion 68 adjacent portion 62 is formed on pin 16 immediately below portion 62 and has a ball bearing 70 positioned therearound on which trunnion 64 is carried.

Immediately below portion 68 is formed a fourth reduced portion 72 of pin 16. Portion 72 is threaded and provided with a washer 74 immediately below bearing 70 to carry said bearing. This assembled connection is secured on the lower end of pin 16 by a nut 76 which is turned on threaded portion 72 and held in a fixed position thereon by a pin which extends through aperture 78 in the lower end of pin 16.

As stated hereinbefore, upper control arm 14 extends inwardly from connection 18 through aperture 40 in wheel panel 34 to its connection with member 12.

A trunnion member 80 having its ends extending through apertures 176 and 178 of arm 14 (Figures 11 and 12) and rotatable therein is provided with spaced apertures through which extend bolts 82 (Figures 2 and 3). Bolts 82 extend outwardly through a plurality of shims 84 and through sleeves 86 which extend between apertures 236 and 248 (Figure 7) of member 12. On the outer end of bolts 82 are positioned lock washers 88 and nuts 90 to form a rigid connection between trunnion member 80 and the member 12. Shims 84 are positioned between trunnion 80 and member 12 to adjust the caster and camber of the wheels 2. It will be noted that as the inner ends of member 14 are rotatably carried by trunnion 80, the arms 14 are thereby permitted to be freely raised and lowered.

Rubber bumper 26 is secured adjacent the underside of raised portion 182 of arm 14 by a bolt 94 which is molded in the rubber bumper 26 and extends upwardly through aperture 184 (Figure 12) and the nut 96 turned on the outer end of bolt 94.

The connection between the side rail 30 of the frame and the cross member 4 having upwardly extending stampings 28 and 32 secured thereto is comprised of a bolt 36 extending first through an aperture in stamping 28 and then through aligned apertures in wheel housing 34, side rail 30 and stamping 32. The apertures in wheel housing 34 and rail 30 are provided with a sleeve 98 which is in turn provided with a pair of sleeves 100 composed of rubber or other sound deadening material. Bolt 36 extends through the sound deadening sleeves 100 and in this manner the side rail 30 is insulated in regard to the cross member 4. As stated before, the inner end of bolt 36 is provided with a nut 38 which holds this connection together.

To the outer ends of the cross member 4 are secured brackets 102 (Figures 1, 2, 3 and 4) on the bottom of which are secured rubber bumpers 104 (Figures 1 and 2) by bolts 106 which are molded in the bumpers 104 and extend upwardly through apertures in the lower sides of brackets 102 and have nuts 108 turned on the upper ends thereof. Bumper 104 is designed to engage the downwardly cupped portions 110 of lower control arms 6 when wheels 2 are raised excessively.

Tower 10 extends upwardly through aligned flanged apertures in the bottom and top of cross member 4 and at its bottom has a radially extending peripheral flange 112 (Figures 2 and 3) which abuts the bottom of cross member 4 and is welded thereto. The aperture in the bottom of cross member 4 through which tower 10 extends is defined by an upwardly extending peripheral flange 114 which is welded to tower 10. The aperture in the top of cross member 4 through which tower 10 extends is defined by an upwardly extending peripheral flange 116 which is welded to tower 10. Near the top of tower 10 said tower is provided with a first reduced portion 118 and immediately above portion 118 and at the top of tower 10 is formed a second and further reduced portion 120.

Within portion 118 of tower 10 is positioned a metal sleeve 122 which has a reduced portion 124 which extends to the top of tower 10. Within sleeve 122 is positioned an insulator 126 of rubber or similar material having a cross section defining substantially a right angle. Within tower 10 is positioned a compression spring 128 having its one end placed against insulator 126 and extending downwardly therefrom toward lower control arm 6 to its seat on a second insulator 130 which is similar to insulator 126.

Insulator 130 is positioned around a tower 132 formed near the center of lower control arm 6. This is more clearly shown in Figures 8, 9 and 10. Spring 128 is retained in this manner between the top of tower 10 and control arm 6 in a slightly compressed state and is subject to further compression when the wheels 2 are moved upwardly, thus providing a cushioned ride for the vehicle.

Secured at its top in a crown 134 formed near the center of member 12 is a shock absorber 136. The top of shock absorber 136 is provided with a bolt 138 extending therefrom through an aperture 140 (Figures 6 and 7). Around bolt 138 below aperture 140 is first positioned a cup-like washer 142 and then a resilient grommet 144 which abuts the underside of crown 134.

Immediately above crown 134 and adjacent thereto and positioned around bolt 138 is a second washer 146 similar to washer 142. Around bolt 138 and upon washer 146 is positioned a second grommet 148 similar to grommet 144. Upon grommet 148 is positioned a washer 150 similar to washers 142 and 148 but inverted with respect thereto.

On the upper end of bolt 138 is threaded a nut 152 which is turned downwardly thereon to pull bolt 138 and shock absorber 136 upwardly to compress grommets 144 and 148 and thereby form a semi-rigid upper connection for shock absorber 136. From this upper connection just described, shock absorber 136 extends downwardly through an aperture 154 (Figures 2 and 3) in the top of the tower 10 and a second aperture 156 in the top of sleeve 122, said aperture 156 being in alignment with aperture 154.

Shock absorber 136 extends downwardly substantially through the center of spring 128 to its bottom where it is defined by a downwardly extending bolt 158 which is identical to bolt 138 on the upper end of shock absorber 136. Bolt 158 is secured to crown 162 of plate 160 in exactly the same manner as bolt 138 is secured to crown 134 of member 12. The central portion of plate 160 defines a crown 162 extending upwardly as does crown 134 of member 12. Plate 160 is secured to control arm 6 by bolts 164 which extend upwardly through aligned apertures in plate 160 and the top of crown 132 of arm 6 and have nuts 166 turned on the upper threaded ends thereof. Crown 162 extends upwardly through aperture 168 (Figures 8, 9 and 10) formed in crown 132 of lower arm 6.

The upper control arm 14 is shown in detail in Figures 11, 12 and 13. Arm 14 is composed of a pair of channel portions 169 extending outwardly in a converging manner and joined together by a web portion 170. A flange 172 (Figure 12) extends around the outer end portion 170 and joins the outer walls 174 of the channel portions 169.

Near the inner ends of members 169 are formed aligned apertures 176 formed in walls 174 and a second pair of aligned apertures 178 of the same diameter as apertures 176 but formed through the inner walls 180 of members 169. Apertures 178 are in alignment with apertures 176 so that the ends of trunnion member 80 (Figures 1 and 2) may be positioned therein.

Web portion 170 is provided with a raised portion 182 extending between portions 169 and having an aperture 184 designed to receive bolt 94 (Figure 2) which holds the rubber bumper 26 in position. Immediately forward of portion 182, web portion 170 is provided with the socket member 42 which has been described hereinbefore in relation to Figure 2. Portion 170 is further provided with apertures 186 around and remote from socket 42 which are designed to receive bolts 60 (Figure 2) which secure ball retainer 52 below the socket 42.

It will be noted that the upper control arm 14 may be stamped out of a single piece of sheet metal.

Lower control arm 6 is shown in detail in Figures 8, 9 and 10, and is like upper control arm 14 is that it is provided with a pair of channel shaped members 190 similar to members 169 and which extend outwardly and converge to a point where they are narrowly separated by a web portion 192.

The channel portions 190 consist of outer walls 194 and inner walls 196. The downwardly extending outer walls 194 are each provided with an outwardly extending flange 198 which extends along their lower outside surface only and are terminated near the inner ends 200 of the portions 190 as at 202. Flanges 198 in a like manner are terminated near the outer end 204 of portions 190 as at 206.

The web portion 192 is provided with a first raised portion 208 surrounding the tower 132 formed therein. Tower 132 as described before in connection with Figure 2 is provided in its top with an aperture 168 in which is positioned the tower 162 (Figure 2) of member 160 (Figure 2) as described hereinbefore. Tower 132 is further provided with apertures 210 which are adapted to receive bolts 164 (Figure 2), said bolts being employed to secure member 160 to arm 6 with its tower 162 positioned within aperture 168.

Web 192 is provided with raised ribs 212 which extend radially about the center of aperture 168 and are formed with their inner ends within the periphery of raised portion 208. Ribs 212 are provided to strengthen arm 6.

Outwardly from the raised portion 208 web 192 is provided with a dished portion 110 described in connection with Figure 2. Portion 110 is provided with an aperture 214 in its bottom which permits water and other foreign matter to escape from portion 110.

It will be noted that lower control arm 6, like upper control arm 14, may be stamped from a single piece of sheet metal.

Near their inner ends, the channel portions 190 are provided with aligned apertures 216 in their outer walls 194 and aligned apertures 218 in their inner walls 196. Apertures 216 and 218 are in alignment to receive bolts 8 (Figures 1 and 2) by which control arms 6 are secured to the cross member 4. Between walls 194 and 196 adjacent apertures 216 and 218 are positioned metal washers 217 which prevent walls 194 and 196 being squeezed together. Washers 217 are provided with apertures in their centers which are aligned with apertures 216 and 218 to permit sleeve bolts 8 to be passed therethrough. Near the outer ends thereof, walls 194 and 196 are provided with aligned apertures 219 and 221, respectively, into which the ends of trunnion 64 (Figure 2) extend. Washers 223, similar to washers 217, are positioned between walls 194 and 196 adjacent apertures 219 and 221 and are provided with apertures aligned with apertures 219 and 221.

Upper control-arm-carrying member 12 is shown in detail in Figures 6 and 7. Member 12 is comprised of a lower stamping 220 which is provided with a flat base portion 222 designed to rest on the top of tower 10 (Figures 1 and 2). Stamping 220 is provided with a first upwardly extending portion 224 and a vertical inner portion 226 defining its inner end.

It will be noted from Figure 7 that member 220 is designed basically similar to the upper and lower control arms in that it is composed of a pair of spaced channel portions 228 which extend outwardly and nearly converge at their outer ends.

Channel portions 228 are provided with flanges 230 extending outwardly and inner flanges 232. Near the inner and upper ends 234 of portions 228 are provided flanged apertures 236. The channel portions 228 are upwardly opened and the second stamping 238 of member 12 is provided and designed to completely cover the member 220.

Stamping 238 has a pair of downwardly open channel portions 240 which are provided with outwardly extending flanges 242 and inwardly extending flanges 244. The channel portions 240, flanges 242 and flanges 244 of member 238 are designed to completely cover channel portion 228, flanges 230 and flanges 232 of stamping 220. Portions 240 of member 238 are provided near their upper ends 246 with flanged apertures 248 which are in alignment with apertures 236 of member 220. These apertures 236 and 248 are designed to receive the bolts 82 (Figure 2) which carry the trunnion member 80 (Figure 2) which in turn carries the control arm 14.

Member 12 is provided with a tube member 86 extending between each pair of apertures 236 and 248 and surrounding the flanges thereof. Members 86 are provided to strengthen member 12, maintain said apertures in spaced relation and form a housing for bolts 82.

Between channel portions 240, member 238 is provided with a web 250. Web 250 is stamped upwardly to form tower 134, the function of which is described in connection with Figure 2.

Near its outer end, member 220 is provided with a pair of flanged apertures 252 (Figure 6) which are in alignment with flanged apertures 254 formed near the outer end of member 238.

Adjacent tower 134 and opposite apertures 254, web 250 of member 238 is provided with a pair of flanged apertures 256 which are in alignment with a pair of flanged apertures 258 formed in portion 222 of member 220. Aligned apertures 252 and 254 are designed to receive bolts which will secure member 12 to the top of tower 10 (Figure 1). Aligned apertures 256 and 258 perform a like function.

Each pair of apertures 256 and 258 are provided with a tubular member 257 extending therebetween similar in form and function to tube members 86.

The cross member 4 which extends between and carries the front wheels of the vehicle is shown in detail in Figures 3, 4 and 5. Cross member 4 is composed of a channel member 260 (Figure 5) having a bottom 262, a substantially vertical front wall 264, a vertical rear wall 266 and a horizontal flange 268 extending around the entire periphery of member 260. Channel member 260 is provided with a cover plate 270 which is secured to the flange 268 by welding or other suitable means. Cover 270 is provided with a pair of elongated depressions 272 each extending from approximately the center of member 270 towards its ends. Depressions 272 are provided for additional strength.

Within channel member 260 is secured an elongated A-shaped stamping 274 having its top abutting cover 270 and its legs secured to the bottom 262 of member 260. A-shaped stamping 274 extends between the towers 10 and is provided to strengthen the cross member 4.

In the sides of member 274 are formed a series of spaced depressions 276 which make the member 274 more rigid. At spaced intervals between the depressions 276, member 274 is provided with a series of apertures 278.

On its underside at its center, cross member 4 is provided with a stamping 280 which is provided with a downwardly extending peripheral flange 282. Stamping 280 is riveted to the bottom 262 of channel member 260. Stamping 280 is provided with a flange aperture 284 in which is positioned and rigidly secured a sleeve 286 which extends upwardly through a flanged aperture 288 which is formed in the bottom of the well 290 which is stamped downwardly in the cover member 270. Sleeve 286 is rigidly secured within these apertures by welding and a pair of bearings 292 are positioned within the sleeve.

Bolt 294 (Figure 3) extends downwardly through the bearings 292 below cross member 4 and has journaled on its lower end the idler arm 296 of the steering mechanism of the vehicle. The idler arm 296 has its inner end positioned within the flange 282 (Figure 5) of member 280 and is provided with a pair of ears 298. Idler arm 296 extends backwardly from bolt 294 through a cutout portion 300 of the member 280 to its rearmost end to which is rotatably secured the inner end of the manually controlled steering drag link 295 and the inner ends of steering tie rods 297. The outer ends of tie rods 297 are rotatably secured to steering arms 299 portions of which are rigidly secured between wheel pins 16 and spindles 22 of each wheel 2 in a substantially horizontal position by nuts 24 (Figures 1 and 2) so that pins 16 may be rotated thereby. This steering mechanism is manually controlled through the arm 301 which is rotatably secured to the outer end of link 295 and is oscillated to pull and push link 295 by energy transmitted thereto through gears in housing 303 to which is secured the lower end of steering column 305 adjacent the upper end of which is positioned the usual hand steering wheel. This provides the steering mechanism for the automobile.

As idler arm 296 is rotated about the axis of bolt 294 by link 295 in either direction within cutout portion 300, this rotation will be limited by the ears 298 striking the ends 281 (Figure 5) of the flange 282 of the member 280. In this manner a limitation on the amount the wheels of the vehicle may be turned is provided.

Shafts 302 are positioned within aligned apertures in walls 264 and 266 of cross member 4 and have threaded ends 304 (Figure 3) around which the inner ends of the lower control arms 6 are telescopically positioned. Washers 306 are positioned around each end of the shafts 302 and abut the adjacent walls 264 and 266 of cross member 4.

Internally threaded sleeve bolts 8 (Figure 3) are turned on the threaded ends 304 of the shafts 302 and are positioned within the apertures 216 and 218 (Figure 8) of the lower control arms 6. Thus the bolts 8 form bearings between the control arms 6 and the shafts 302. Bolts 8 are provided with an outer enlarged portion 310 which abuts control arms 6 adjacent the aperture 216, thereby holding the control arms in position on the bolts 8 and with grease fittings 9 to provide means for lubricating these connections.

Stampings 28 as shown in Figures 1, 3 and 4 are provided with outwardly turned portions 312 which have cutout portions 314 designed to fit the outer periphery of the towers 10. Stampings 28 are welded to the cover 270 of the cross member 4 and portions 314 of stampings 28 are welded to the towers 10. In this manner additional support is provided for said towers. Stampings 32 are also secured to cover 270 as by welding.

While we have described our invention in some detail, we intend this description to be an example only and not as a limitation of our invention, to which we make the following claims:

1. An independent wheel suspension for a vehicle comprising a frame cross member, aligned apertures formed in the top and bottom of said cross member adjacent its end, a cylindrical member having a partially closed top secured within said aligned apertures and extending upwardly therefrom, a lower control arm rotatably secured to said cross member and extending outwardly therefrom, an upper control arm rotatably secured to said cylindrical member and extending outwardly therefrom, a wheel carrying member extending between the outer ends of said upper and lower control arms and rotatably secured thereto, and a compression spring interposed between and abutting said lower control arm and the top of said cylindrical member.

2. An independent wheel suspension for a vehicle comprising a frame, a frame cross member resiliently secured to said frame, aligned apertures formed in the top and bottom of said cross member adjacent the end thereof, a cylindrical member telescopically positioned within said aligned apertures and extending upwardly therefrom and having a partially closed top, a lower control arm rotatably secured to said cross member and extending outwardly therefrom, an upper control arm, means secured to the top of said cylindrical member and rotatably carrying said upper control arm, a wheel carrying member extending between the outer ends of said upper control arm and said lower control arm, and a compression spring interposed between and abutting said lower control arm and the top of said cylindrical member.

3. An independent wheel suspension comprising a resiliently mounted frame cross member, aligned apertures formed in the top and bottom of said cross member, a cylindrical member rigidly secured within said aligned apertures and extending upwardly therefrom, a lower control arm rotatably secured to said cross member and extending outwardly therefrom, an outwardly extending upper control arm, means secured to said cylindrical member for rotatably carrying said upper control arm, wheel carrying means interposed between the outer ends of said upper and lower control arms, a first spring seat formed in the top of said cylindrical member, a second spring seat formed in said lower control arm, and a compression spring interposed between and abutting said spring seats.

4. An independent wheel suspension for a vehicle comprising a frame cross member, aligned apertures formed in the top and bottom of said cross member and adjacent to its outer end, a cylindrical member rigidly secured within said apertures and extending upwardly therefrom and having a partially closed upper end, a lower control arm rotatably secured to said cross member and extending outwardly therefrom, an upper control arm, means secured to said cylindrical member for rotatably carrying said upper control arm, wheel carrying means extending between the outer ends of said upper and lower control arms and rotatably secured thereto, a spring seat formed on said lower control arm, a spring seat positioned within said cylindrical member below its upper end, and a compression spring interposed between and abutting said spring seats.

5. An independent wheel suspension comprising a resiliently mounted frame cross member, aligned apertures formed in the upper and lower walls of said cross member, a cylindrical member positioned and secured within said apertures and extending upwardly therefrom and having a partially closed upper end, an outwardly extending upper control arm, a lower control arm rotatably secured to said cross member and extending outwardly therefrom, means secured to the upper end of said cylindrical member for rotatably carrying said upper control arm, a spring seat secured within the upper end of said cylindrical member, a spring seat formed in said lower control arm, a spring interposed between and abutting said spring seats, and a shock absorber extending through said spring and having its upper end resiliently secured to the means for carrying the upper control arm and its lower end secured to the lower control arm.

6. An independent wheel suspension comprising a resiliently mounted frame cross member, aligned apertures formed in the upper and lower walls of said cross member near its outer end, a cylindrical member positioned and secured within said aligned apertures and extending upwardly therefrom and having a partially closed upper end, a lower control arm rotatably secured to the cross member and extending outwardly therefrom, an outwardly extending upper control arm rotatably secured adjacent the upper end of said cylindrical member, wheel carrying means extending between the outer ends of said control arms and rotatably secured thereto, a lower spring seat formed on said lower control arm, an upper spring seat secured within the upper end of said cylindrical member, a compression spring interposed between and abutting said spring seats, a shock absorber positioned within said spring and extending upwardly through the upper end of said cylindrical member, resilient means for securing the upper end of said shock absorber to the means for carrying the upper control arm, and a second resilient means for securing the lower end of said shock absorber to said lower control arm.

FLOYD F. KISHLINE.
ROSS H. PHELPS.
JOHNSTON STUART VOIGT.

REFERENCES CITED

The following references are of record in the file of this patent:

UNITED STATES PATENTS

| Number | Name | Date |
| --- | --- | --- |
| 2,048,953 | Sherman | July 28, 1936 |
| 2,070,775 | Bell | Feb. 16, 1937 |
| 2,092,612 | Olley | Sept. 7, 1937 |
| 2,153,083 | Griswold | Apr. 4, 1939 |
| 2,228,107 | Best | Jan. 7, 1941 |
| 2,246,824 | Wheat | June 24, 1941 |
| 2,298,585 | Phelps | Oct. 13, 1942 |
| 2,299,935 | Slack et al. | Oct. 27, 1942 |
| 2,301,593 | Ulrich | Nov. 10, 1942 |
| 2,314,505 | McIntyre et al. | Mar. 23, 1943 |
| 2,325,894 | Wahlberg et al. | Aug. 3, 1943 |
| 2,334,597 | Badertscher | Nov. 16, 1943 |
| 2,335,546 | Sladky et al. | Nov. 30, 1943 |
| 2,405,458 | Slack et al. | Aug. 6, 1946 |